United States Patent
Pan et al.

(10) Patent No.: US 10,077,847 B2
(45) Date of Patent: Sep. 18, 2018

(54) WATER STOPPAGE STRUCTURE UTILIZED IN A WATER PURIFIER FILTER CORE

(71) Applicant: Xiamen Runner Industrial Corporation, Xiamen (CN)

(72) Inventors: Yang-Fa Pan, Xiamen (CN); Zeng-Fu Xu, Xiamen (CN); Jian-Yong Yan, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 13 days.

(21) Appl. No.: 15/399,738

(22) Filed: Jan. 6, 2017

(65) Prior Publication Data
US 2017/0197159 A1    Jul. 13, 2017

(30) Foreign Application Priority Data
Jan. 11, 2016  (CN) .......................... 2016 1 0014421

(51) Int. Cl.
| | |
|---|---|
| *B01D 27/10* | (2006.01) |
| *F16K 15/02* | (2006.01) |
| *F16L 29/02* | (2006.01) |
| *F16K 15/06* | (2006.01) |
| *C02F 1/00* | (2006.01) |

(52) U.S. Cl.
CPC .......... *F16K 15/063* (2013.01); *B01D 27/106* (2013.01); *B01D 2201/302* (2013.01); *C02F 1/001* (2013.01); *C02F 2201/004* (2013.01); *C02F 2201/005* (2013.01)

(58) Field of Classification Search
CPC .................. B01D 61/10; B01D 35/153; B01D 2201/4023; B01D 27/106; B01D 27/108; F16K 15/063; C02F 2201/004; C02F 2201/005
USPC .................................. 210/234, 235, 117, 136
See application file for complete search history.

(56) References Cited

U.S. PATENT DOCUMENTS

| | | | |
|---|---|---|---|
| 2006/0000754 A1* | 1/2006 | Kang ................... | B01D 35/153 210/97 |
| 2014/0110331 A1* | 4/2014 | Baird ................... | B01D 35/153 210/346 |

* cited by examiner

*Primary Examiner* — Terry K Cecil
(74) *Attorney, Agent, or Firm* — Chun-Ming Shih

(57) ABSTRACT

A water stoppage structure utilized in a water purifier filter core, comprising a filter core main body, provided with a water input port, a first water output port, and a second water output port; a filter core, disposed in the filter core main body; a seat body, disposed at one end of the filter core main body, matching and working in cooperation with the water input port, the first water output port, and the second water output port of the filter core main body; a first check valve, disposed at the water import port, and on a water channel leading to the filter core main body, for allowing water to pass only through the filter core main body; a first water passage switch valve, disposed on the second water output port; and a second water passage switch valve, disposed on the first water output port.

7 Claims, 6 Drawing Sheets

WATER STOPPAGE STRUCTURE UTILIZED IN A WATER PURIFIER FILTER CORE

BACKGROUND OF THE INVENTION

Field of the Invention

The present invention relates to a water stoppage structure, and in particular to a water stoppage structure utilized in a water purifier filter core.

The Prior Arts

In recent years, the water pollution problem is getting increasingly serious, more and more people utilize water purifier to purify water, before it is put into daily use.

However, presently, most of the water purifiers are not provided with water stoppage function, so that in replacing the filter core, water stored in the filter core tends to spill out, to cause quite inconvenience.

Therefore, presently, the design and performance of the water purifier filter core is not quite satisfactory, and it leaves much room for improvement.

SUMMARY OF THE INVENTION

In view of the problems and drawbacks of the prior art, the present invention provides a water stoppage structure utilized in a water purifier filter core, that is simple in structure, novel in design, to prevent water spill out while replacing the filter core, in achieving safety and convenience in operation.

The objective of the present invention is to provide a water stoppage structure utilized in a water purifier filter core, comprising: a filter core main body, a filter core, a seat body, a first check valve, a first water passage switch valve, and a second water passage switch valve. The filter core main body is provided with a water input port, a first water output port, and a second water output port. The filter core is disposed in the filter core main body. The seat body is disposed at one end of the filter core main body, matching and working in cooperation with the water input port, the first water output port, and the second water output port of the filter core main body. The first check valve is disposed at the water import port, and on a water channel leading to the filter core main body, for allowing water to pass only through the filter core main body. The first water passage switch valve is disposed on the second water output port. The second water passage switch valve, disposed on the first water output port.

In an aspect of the present invention, the water stoppage structure utilized in a water purifier filter core further includes two open-and-close switches, disposed respectively on the first water passage switch valve and the second water passage switch valve, such that when the filter core main body and the seat body are attached to each other, water is allowed to pass through, and when the filter core main body and the seat body are detached from each other, water is closed and is not allowed to pass through.

In another aspect of the present invention, the water stoppage structure utilized in a water purifier filter core further includes: a filter core outer shell, a filter core bottom cover, a connection sleeve, and a first tight seal ring. The filter core outer shell is disposed and included in the filter core main body. The filter core bottom cover is disposed and included in the filter core main body. The connection sleeve is sleeved on a head portion of the filter core, and is disposed in a cavity at a head portion of the filter core main body. The first tight seal ring is disposed between an outer perimeter of the connection sleeve and the cavity at the head portion of the filter core main body, to separate connection and communication inside and outside the filter core main body. Wherein the first check valve is disposed on the connection sleeve, a water input end of the first check valve is connected and in communication with the water input port of the filter core main body, a water output end of the first check valve is in communication with a chamber between an inner wall of the filter core outer shell and an outer perimeter of the filter core, through a through hole on a side portion of the connection sleeve.

In yet another aspect of the present invention, a second water output port of the filter core is connected and in communication with a central through hole of the connection sleeve; while a first water output port of the filter core is connected and in communication with a water passage channel of the connection sleeve.

In a further aspect of the present invention, the first water passage switch valve includes a central rod having a central channel, and a liftable valve core in an indent slot on an upper portion of the central rod. A lower end of the central rod is thread-connected to the central through hole of the connection sleeve. The upper portion of the central rod is in communication with the second water output port of the seat body. A first spring is disposed between a lower portion of the liftabe valve core, and the indent slot on the upper portion of the central rod. A protrusion rod is disposed on an upper portion of the liftable valve core. A press ring is sleeved around an outer perimeter of the protrusion rod, and is fixed in the indent slot on the upper portion of the central rod. The lower surface of the press ring is a conical face, to act in cooperation with a second tight seal ring fixed on an outer perimeter of the protrusion rod to seal water. And a third tight seal ring is disposed on an outer wall at the upper portion of the central rod, to form tight seal with an inner wall of a first downward protrusion tube of the seat body.

In another aspect of the present invention, the second water passage switch valve includes a liftable sleeve, sleeved around the outer perimeter of the central rod, and a second spring, disposed between upper surfaces of the liftable sleeve and the connection sleeve. The liftable sleeve is sleeved inside an upward protrusion tube body of the filter core outer shell. A fourth tight seal ring is disposed between an outer perimeter of the liftabe sleeve, and an inner wall of the upward protrusion tube body. A fifth tight seal ring is disposed between the outer perimeter of the liftable sleeve and an inner wall of the second downward protrusion tube. A water passage gap is disposed between the inner wall of the liftable sleeve and an outer wall of the central rod. A first water output port of the seat body and a water passage channel of the connection sleeve are connected and in communication through the water passage gap.

In yet another aspect of the present invention, the water stoppage structure utilized in a water purifier filter core further includes a first downward protrusion tube, disposed on the seat body, for restricting an upward movement of the liftable sleeve, so that the water passage gap is in communication with the first water output port of the seat body. When the filter core main body is detached from the seat body, the liftable sleeve is released from the restriction of the first downward protrusion tube, such that the liftable sleeve is moved upward, to make an inner wall of a downward indent slot on an upper portion of the liftable sleeve to form tight seal with the third tight seal ring in cooperation, to block water from going out of the water passage gap.

In a further aspect of the present invention, the water stoppage structure utilized in a water purifier filter core further includes: a double tight seal ring, a sixth tight seal ring, and a seventh tight seal ring. The double tight seal ring is disposed between an outer wall for a tube body of a second water output port of the filter core, and the central through hole of the connection sleeve. The sixth tight seal ring is disposed between the outer wall of the connection sleeve, and an inner wall of the upward protrusion tube body of the filter core outer shell. The seventh tight seal ring is disposed between an outer wall of the upward protrusion tube body of the filter core outer shell, and the inner wall of the second downward protrusion tube of the seat body.

The present invention also provides a method of operation for the water stoppage structure utilized in a water purifier filter core, that is realized through using the water stoppage structure, comprising: the filter core main body, provided with the water input port, the first water output port, and the second water output port; the filter core, disposed in the filter core main body; the seat body, disposed at one end of the filter core main body, matching and working in cooperation with the water input port, the first water output port, and the second water output port of the filter core main body; the first check valve, disposed at the water import port, and on a water channel leading to the filter core main body, for allowing water to pass only through the filter core main body; the first water passage switch valve, disposed on the second water output port; and the second water passage switch valve, disposed on the first water output port.

The method includes the following steps: when in operation, the filter core main body is inserted into the seat body, so that the water input port, the first water output port, and the second water output port of the filter core main body match three water ports on the seat body. At this time, the first water passage switch valve and the second water passage switch valve are opened, raw water flows in from the water input port of the seat body into the water input port of the filter core main body. Then, through filtering of the filter core main body, purified water and waste water are output from the second water output port, the first water output port of the filter core main body, and the second water output port, the first water output port of the seat body respectively.

When replacing the filter core, firstly, the filter core main body is detached from the seat body, so that the first water passage switch valve and the second water passage switch valve are closed, and water is not allowed to pass through, such that water stored in the filter core will not be released. The open and close of the first water passage switch valve and the second water passage switch valve are performed manually; or alternatively, it is installed in such a way that, when the filter core main body and the seat body are in contact, the first water passage switch valve and the second water passage switch valve are opened, and when the filter core main body and the seat body are not in contact, the first water passage switch valve and the second water passage switch valve are closed.

The present invention further provides a method of operation for the water stoppage structure utilized in a water purifier filter core, comprising the following steps: when in operation, the filter core main body is inserted into the seat body, so that the water input port, the first water output port, and the second water output port of the filter core main body match three water ports on the seat body. At this time, the protrusion rod on the first water passage switch valve is in touch with the seat body, so that the protrusion rod brings the liftable valve core to move downward, to make the second seal ring on the liftable valve core to detach from the cooperation with the conical face. At this time, a central channel in the central rod is connected and in communication with the second water output port of the seat body, and the second water output port of the filter core, to achieve outputting purified water (second water quality). Meanwhile, the first downward protrusion tube restricts an upward movement of the liftable sleeve, to make the water passage gap connect the first water output port of the seat body, and the water passage channel of the connection sleeve, to achieve outputting waste water (first water quality).

When replacing the filter core, firstly, the filter core main body is detached from the seat body, such that the liftable sleeve is relived of the restriction of the first downward protrusion tube, the liftable sleeve is moved up under an action of the second spring. The inner wall of the downward indent slot on the upper portion of the liftable sleeve and the third tight seal ring form into tight seal in cooperation, to block connection and communication for the water passage gap, the first water output port of the seat body, and the water passage channel of the connection sleeve, in achieving not outputting waste water (first water quality). Meanwhile, the protrusion rod on the first water passage switch valve is not pressed by the seat body, the liftable valve core moves up under an action of the first spring, thus the second tight seal ring and the conical face form tight seal in cooperation, to block water output of the central channel, in achieving not outputting purified water (second water quality). The first check valve only receives input water, while it does not output water in a reverse direction.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detail descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
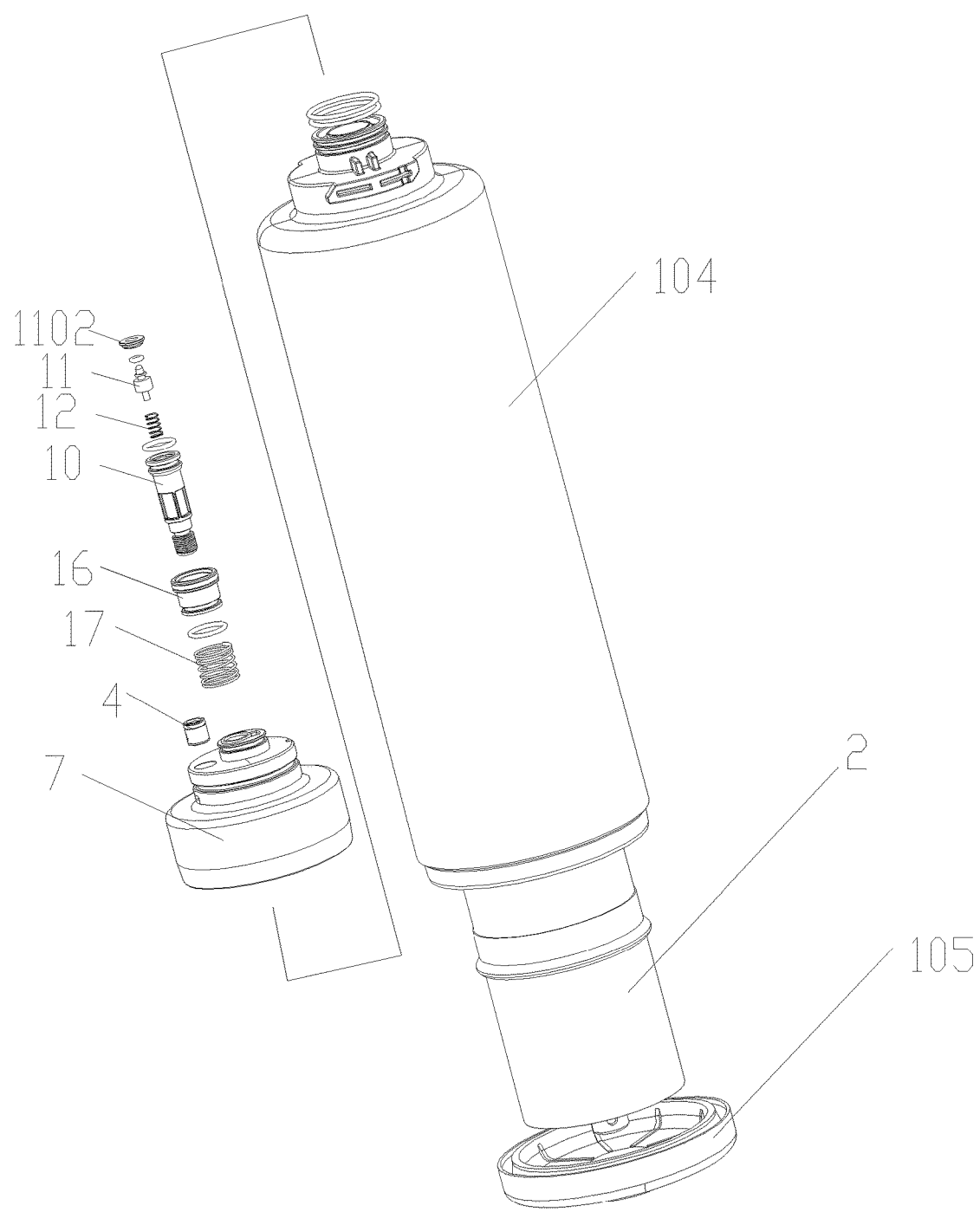
FIG. 1 is an exploded view of a water stoppage structure utilized in a water purifier filter core according to an embodiment of the present invention.
Figure 2:
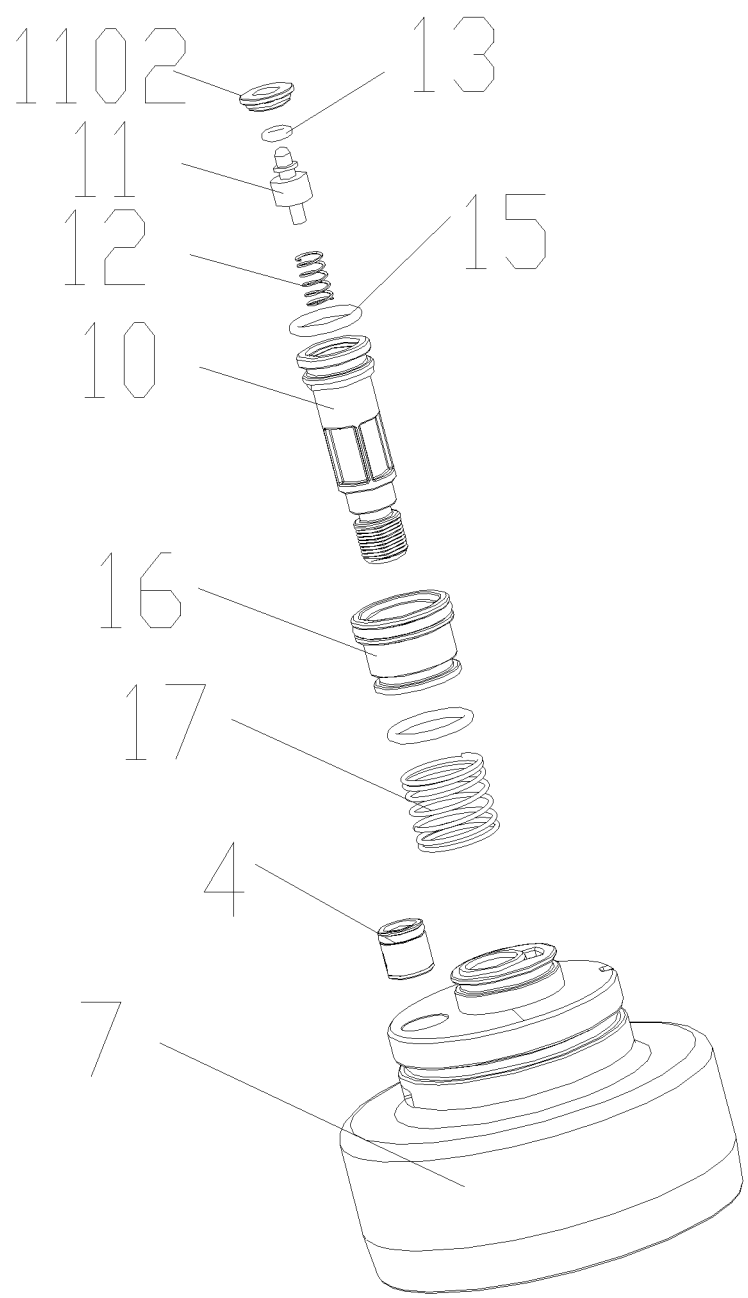
FIG. 2 is a partial view of a schematic diagram of FIG. 1.
Figure 3:
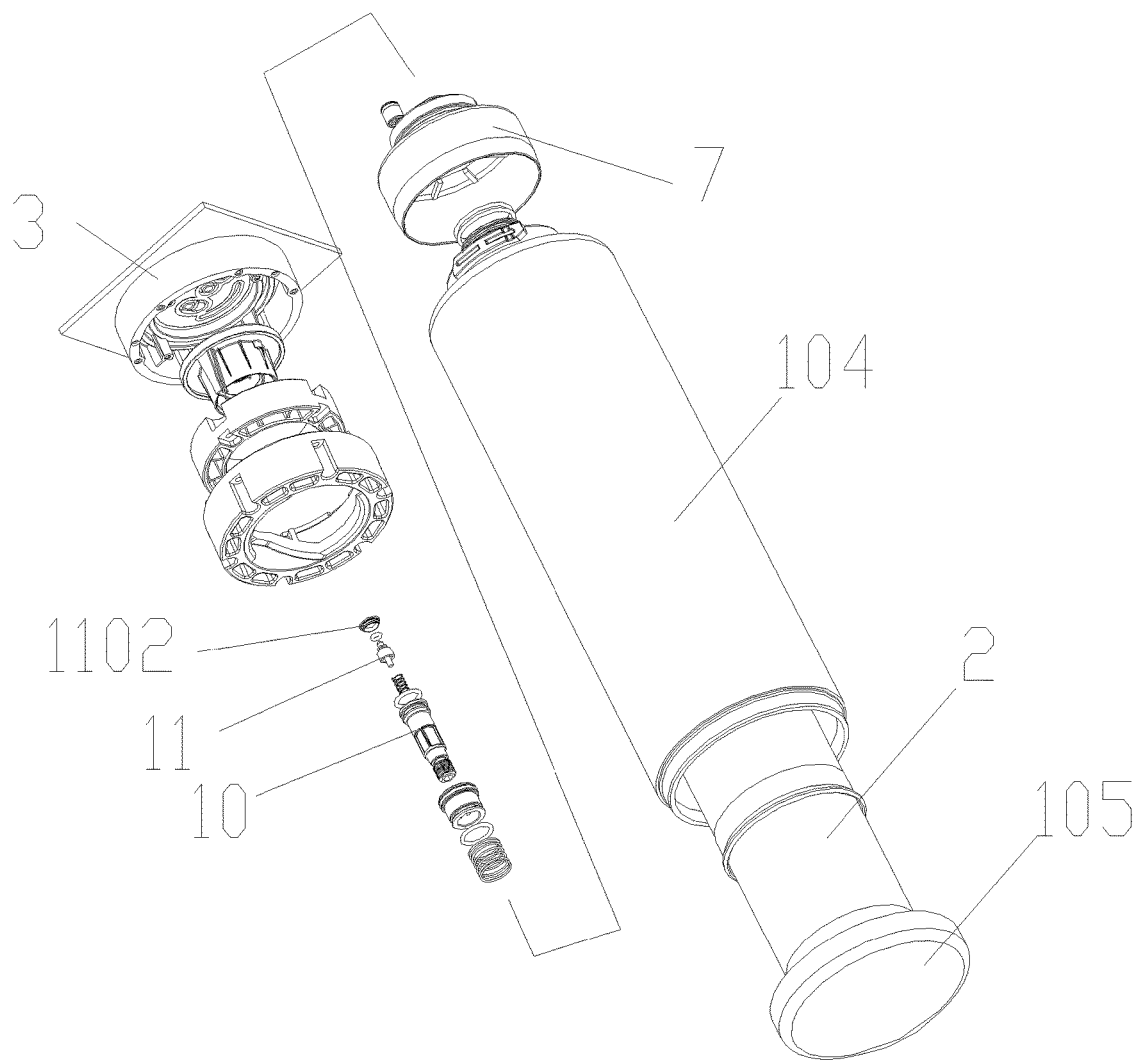
FIG. 3 is another exploded view of a water stoppage structure utilized in a water purifier filter core viewed from another angle according to an embodiment of the present invention.
Figure 4:
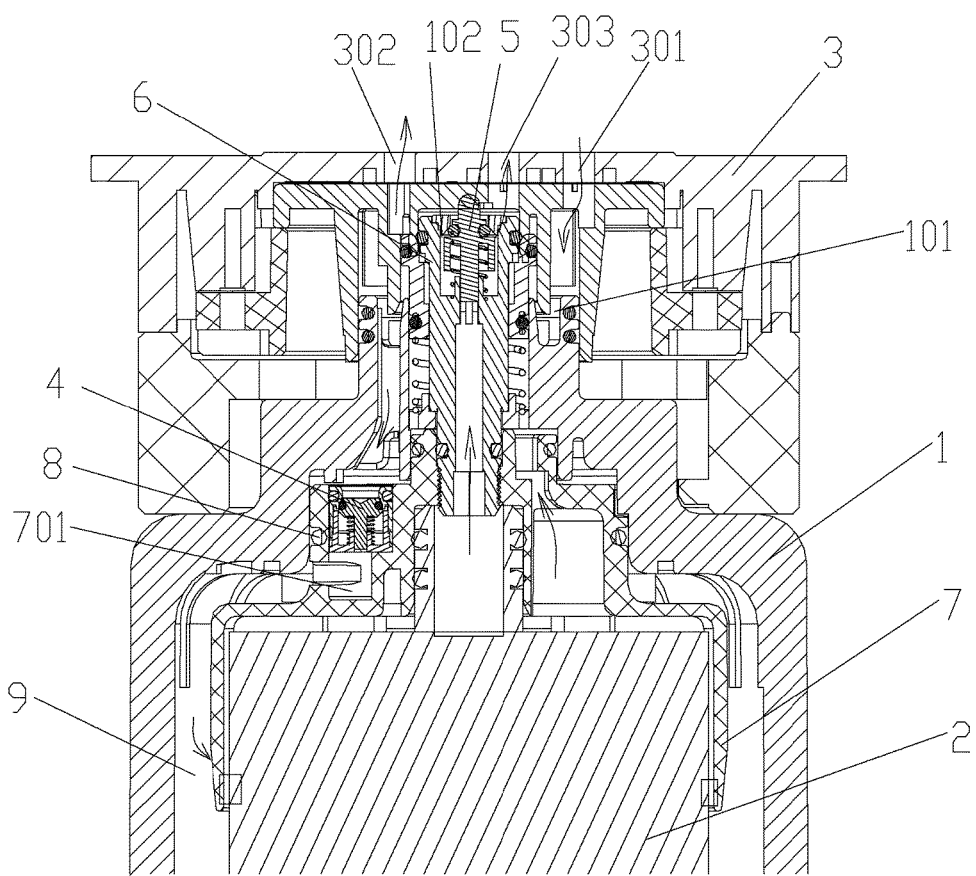
FIG. 4 is a schematic of an upper portion of a water stoppage structure utilized in a water purifier filter core according to an embodiment of the present invention.
Figure 5:
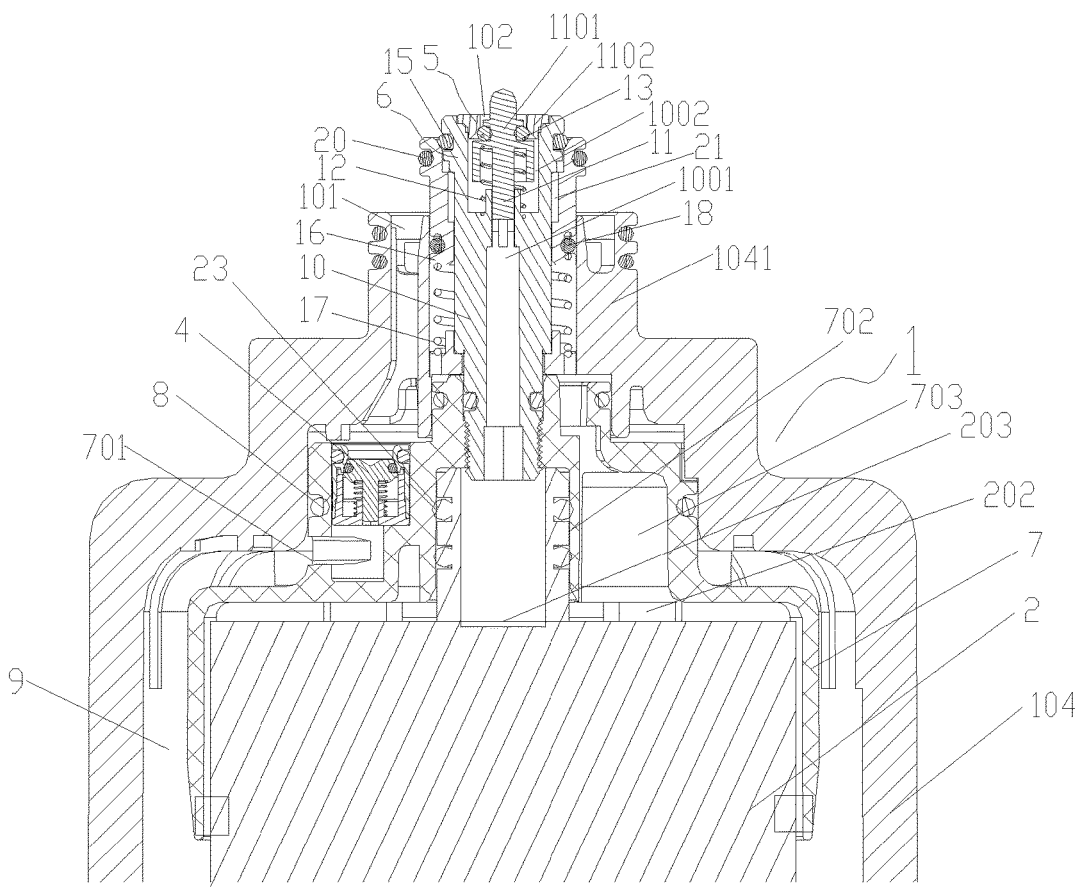
FIG. 5 is a cross section view of a filter core main body when water passing through the filter core according to an embodiment of the present invention.
Figure 6:
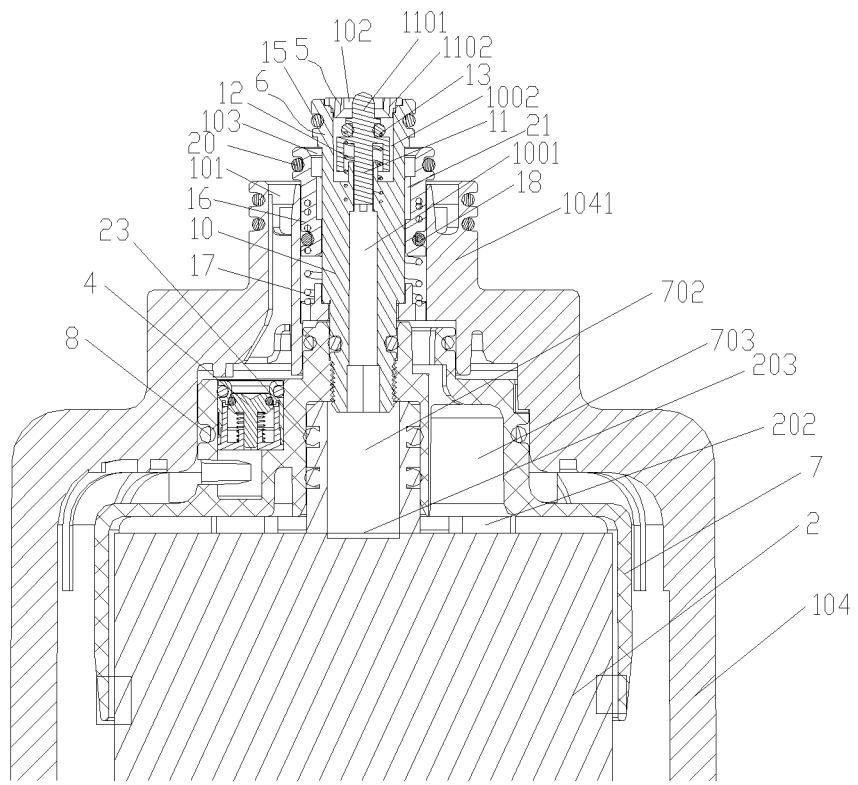
FIG. 6 is a cross section view of a filter core main body when water is blocked from passing through the filter core according to an embodiment of the present invention.
Figure 7:
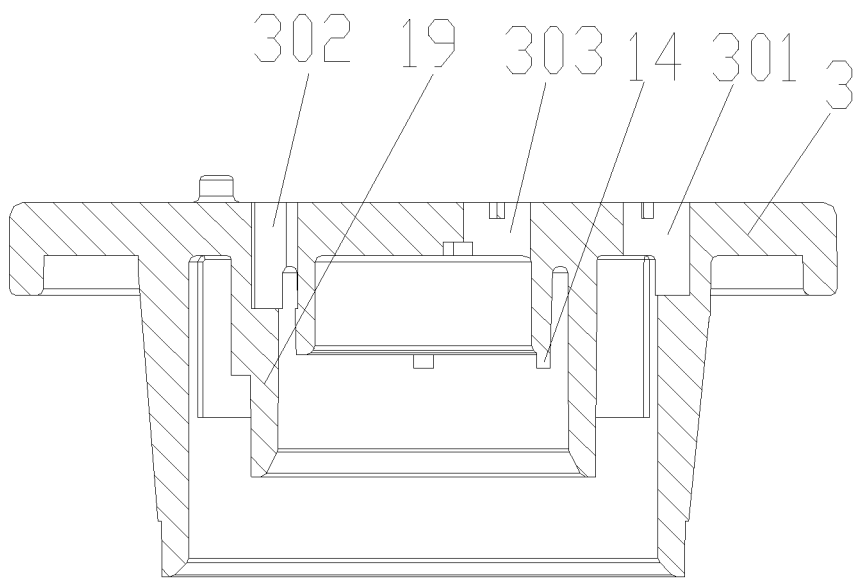
FIG. 7 is a cross section view of a seat body according to an embodiment of the present invention.

Refer to FIGS. 1 to 7 respectively for an exploded view of a water stoppage structure utilized in a water purifier filter core according to an embodiment of the present invention; a partial view of a schematic diagram of FIG. 1; another exploded view of a water stoppage structure utilized in a water purifier filter core viewed from another angle according to an embodiment of the present invention; a schematic of an upper portion of a water stoppage structure utilized in a water purifier filter core according to an embodiment of the present invention; a cross section view of a filter core main body when water passing through the filter core according to an embodiment of the present invention; a cross section view of a filter core main body when water is blocked from passing through the filter core according to an embodiment of the present invention; and a cross section view of a seat body according to an embodiment of the present invention.

As shown in FIGS. 1 to 7, the present invention provides provide a water stoppage structure utilized in a water purifier filter core, comprising: a filter core main body 1, a filter core 2, a seat body 3, a first check valve 4, a first water passage switch valve 5, and a second water passage switch valve 6. The filter core main body 1 is provided with a water input port 101, a first water output port 102, and a second water output port 103. The filter core 2 is disposed in the filter core main body 1. The seat body 3 is disposed at one end of the filter core main body 1, matching and working in cooperation with the water input port 101, the first water output port 102, and the second water output port 103 of the filter core main body 1. The first check valve 4 is disposed at the water import port 101, and on a water channel leading to the filter core main body 1, for allowing water to pass only through the filter core main body 1. The first water passage switch valve 5 is disposed on the second water output port 103. The second water passage switch valve 6, disposed on the first water output port 102.

In an embodiment of the present invention, the water stoppage structure utilized in a water purifier filter core further includes two open-and-close switches, disposed respectively on the first water passage switch valve 5 and the second water passage switch valve 6, such that when the filter core main body 1 and the seat body 3 are attached to each other, water is allowed to pass through, and when the filter core main body 1 and the seat body 3 are detached from each other, water is closed and is not allowed to pass through. The open-and-close switch can be operated manually, the first press indicates open, the second press indicates close. When the user intends to detach the filter core 2, the open-and-close switch can be pressed twice to stop water output, then the filter core 2 can be detached. Of course, this approach is not fully automatic. In the following, another embodiment is described, so that when the filter core main body 1 and the seat body 3 are installed correctly, the first water passage switch valve 5 and the second water passage switch valve 6 are open. In detaching the filter core 2, the first water passage switch valve 5 and the second water passage switch valve 6 are closed.

In an embodiment of the present invention, the water stoppage structure utilized in a water purifier filter core further includes: a filter core outer shell 104, a filter core bottom cover 105, a connection sleeve 7, and a first tight seal ring 8. The filter core outer shell 104 is disposed and included in the filter core main body 1. The filter core bottom cover 105 is disposed and included in the filter core main body 1. The connection sleeve 7 is sleeved on a head portion of the filter core 2, and is disposed in a cavity at a head portion of the filter core main body 1. The first tight seal ring 8 is disposed between an outer perimeter of the connection sleeve 7 and the cavity at the head portion of the filter core main body 1, to separate connection and communication inside and outside the filter core main body 1. Wherein the first check valve 4 is disposed on the connection sleeve 7, a water input end of the first check valve 4 is connected and in communication with the water input port 101 of the filter core main body 1, a water output end of the first check valve 4 is in communication with a chamber 9 between an inner wall of the filter core outer shell 104 and an outer perimeter of the filter core 2, through a through hole 701 on a side portion of the connection sleeve 7.

In an embodiment of the present invention, a second water output port 203 of the filter core 2 is connected and in communication with a central through hole 702 of the connection sleeve 7; while a first water output port 202 of the filter core 2 is connected and in communication with a water passage channel 703 of the connection sleeve 7.

In an embodiment of the present invention, the first water passage switch valve 5 includes a central rod 10 having a central channel 1001, and a liftable valve core 11 in an indent slot 1002 on an upper portion of the central rod 10. A lower end of the central rod 10 is thread-connected to the central through hole 702 of the connection sleeve 7. The upper portion of the central rod 10 is in communication with the second water output port 303 of the seat body 3. A first spring 12 is disposed between a lower portion of the liftabe valve core 11, and the indent slot 1002 on the upper portion of the central rod 10. A protrusion rod 1101 is disposed on an upper portion of the liftable valve core 11. A press ring 1102 is sleeved around an outer perimeter of the protrusion rod 1101, and is fixed in the indent slot 1002 on the upper portion of the central rod 10. The lower surface of the press ring 1102 is a conical face, to act in cooperation with a second tight seal ring 13 fixed on an outer perimeter of the protrusion rod 1101 to seal water. And a third tight seal ring 15 is disposed on an outer wall at the upper portion of the central rod 10, to form tight seal with an inner wall of a first downward protrusion tube 14 of the seat body 3.

In an embodiment of the present invention, the second water passage switch valve 6 includes a liftable sleeve 16, sleeved around the outer perimeter of the central rod 10, and a second spring 17, disposed between upper surfaces of the liftable sleeve 16 and the connection sleeve 7. The liftable sleeve 16 is sleeved inside an upward protrusion tube body 1041 of the filter core outer shell 104. A fourth tight seal ring 18 is disposed between an outer perimeter of the liftabe sleeve 16, and an inner wall of the upward protrusion tube body 1041. A fifth tight seal ring 20 is disposed between the outer perimeter of the liftable sleeve 16 and an inner wall of the second downward protrusion tube 19. A water passage gap 21 is disposed between the inner wall of the liftable sleeve 16 and an outer wall of the central rod 10. A first water output port 302 of the seat body 3 and a water passage channel 703 of the connection sleeve 7 are connected and in communication through the water passage gap 21.

In an embodiment of the present invention, the water stoppage structure utilized in a water purifier filter core further includes a first downward protrusion tube 14, disposed on the seat body 3, for restricting an upward movement of the liftable sleeve 16, so that the water passage gap 21 is in communication with the first water output port 302 of the seat body 3. When the filter core main body 1 is detached from the seat body 3, the liftable sleeve 16 is released from the restriction of the first downward protrusion tube 14, such that the liftable sleeve 16 is moved upward, to make an inner wall of a downward indent slot on an upper portion of the liftable sleeve 16 to form tight seal with the third tight seal ring 13 in cooperation, to block water from going out of the water passage gap 21.

In an embodiment of the present invention, the water stoppage structure utilized in a water purifier filter core further includes: a double tight seal ring 23, a sixth tight seal ring 24, and a seventh tight seal ring 25. The double tight seal ring 23 is disposed between an outer wall for a tube body of a second water output port 203 of the filter core 2, and the central through hole 702 of the connection sleeve 7. The sixth tight seal ring 24 is disposed between the outer wall of the connection sleeve 7, and an inner wall of the upward protrusion tube body 1041 of the filter core outer shell 104. The seventh tight seal ring 25 is disposed between an outer wall of the upward protrusion tube body 1041 of the filter core outer shell 104, and the inner wall of the second downward protrusion tube 19 of the seat body 3.

In the descriptions above, the water input port 301 of the seat body 3 can be connected to the water output port of a faucet water pipe line or a front channel filter, the first water output port 302 of the seat body 3 can be connected to an exhaust water pipe, while the second water output port 303 of the seat body 3 can be connected to a faucet of a drinking fountain.

Also, in the descriptions above, all the water input ports can be raw water input ports, the first water output ports 102, 202,302 can be waste water output ports, the second water output ports 103,203,303 can be purified water output ports. The filter core 2 can be a Reverse Osmosis (RO) film filter core.

The present invention also provides a method of operation for the water stoppage structure utilized in a water purifier filter core, that is realized through using the water stoppage structure, comprising: the filter core main body 1, provided with the water input port 101, the first water output port 102, and the second water output port 103; the filter core 2, disposed in the filter core main body 1; the seat body 3, disposed at one end of the filter core main body 1, matching and working in cooperation with the water input port 101, the first water output port 102, and the second water output port 103 of the filter core main body 1; the first check valve 4, disposed at the water import port 101, and on a water channel leading to the filter core main body 1, for allowing water to pass only through the filter core main body 1; the first water passage switch valve 5, disposed on the second water output port 103; and the second water passage switch valve 6, disposed on the first water output port 102.

The method includes the following steps: when in operation, the filter core main body 1 is inserted into the seat body 3, so that the water input port 101, the first water output port 102, and the second water output port 103 of the filter core main body 1 match three water ports on the seat body 3. At this time, the first water passage switch valve 5 and the second water passage switch valve 6 are opened, raw water flows in from the water input port 301 of the seat body 3 into the water input port 101 of the filter core main body 1. Then, through filtering of the filter core main body 1, purified water and waste water are output from the second water output port 103, the first water output port 102 of the filter core main body 1, and the second water output port 303, the first water output port 302 of the seat body 3 respectively.

When replacing the filter core 2, firstly, the filter core main body 1 is detached from the seat body 3, so that the first water passage switch valve 5 and the second water passage switch valve 6 are closed, and water is not allowed to pass through, such that water stored in the filter core 2 will not be released. The open and close of the first water passage switch valve 5 and the second water passage switch valve 6 are performed manually; or alternatively, it is installed in such a way that, when the filter core main body 1 and the seat body 3 are in contact, the first water passage switch valve 5 and the second water passage switch valve 6 are opened, and when the filter core main body 1 and the seat body 3 are not in contact, the first water passage switch valve 5 and the second water passage switch valve 6 are closed.

The present invention further provides a method of operation for the water stoppage structure utilized in a water purifier filter core, comprising the following steps:

when in operation, the filter core main body 1 is inserted into the seat body 3, so that the water input port 101, the first water output port 102, and the second water output port 103 of the filter core main body 1 match three water ports on the seat body 3. At this time, the protrusion rod 1101 on the first water passage switch valve 5 is in touch with the seat body 3, so that the protrusion rod 1101 brings the liftable valve core 11 to move downward, to make the second seal ring 13 on the liftable valve core 11 to detach from the cooperation with the conical face. At this time, a central channel 1001 in the central rod 10 is connected and in communication with the second water output port 303 of the seat body 3, and the second water output port 203 of the filter core 2, to achieve outputting purified water (second water quality). Meanwhile, the first downward protrusion tube 14 restricts an upward movement of the liftable sleeve 16, to make the water passage gap 21 connect the first water output port 302 of the seat body 3, and the water passage channel 703 of the connection sleeve 7, to achieve outputting waste water (first water quality).

When replacing the filter core 2, firstly, the filter core main body 1 is detached from the seat body 3, such that the liftable sleeve 16 is relived of the restriction of the first downward protrusion tube 14, the liftable sleeve 16 is moved up under an action of the second spring 17. The inner wall of the downward indent slot on the upper portion of the liftable sleeve 16 and the third tight seal ring 15 form into tight seal in cooperation, to block connection and communication for the water passage gap 21, the first water output port 302 of the seat body 3, and the water passage channel 703 of the connection sleeve 7, in achieving not outputting waste water (first water quality). Meanwhile, the protrusion rod 1101 on the first water passage switch valve 5 is not pressed by the seat body 3, the liftable valve core 11 moves up under an action of the first spring 12, thus the second tight seal ring 13 and the conical face form tight seal in cooperation, to block water output of the central channel 1001, in achieving not outputting purified water (second water quality). The first check valve 4 only receives input water, while it does not output water in a reverse direction.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A water stoppage structure utilized in a water purifier filter core, comprising
   a filter core main body, provided with a water input port, a first water output port, and a second water output port;
   a filter core, disposed in the filter core main body;

a seat body, disposed at one end of the filter core main body, matching and working in cooperation with the water input port, the first water output port, and the second water output port of the filter core main body;

a check valve, disposed at the water input port, and on a water channel leading to the filter core main body, for allowing water to pass only through the filter core main body;

a first water passage switch valve, disposed on the second water output port;

a second water passage switch valve, disposed on the first water output port; and a first downward protrusion tube, disposed on the seat body, for restricting an upward movement of a liftable sleeve, so that a water passage gap is in communication with the first water output port of the seat body, when the filter core main body is detached from the seat body, the liftable sleeve is released from the restriction of the first downward protrusion tube, such that the liftable sleeve is moved upward, to make an inner wall of a downward indent slot on an upper portion of the liftable sleeve to form tight seal with a first tight seal ring in cooperation, to block the water from going out of the water passage gap.

2. The water stoppage structure utilized in a water purifier filter core as claimed in claim 1, further comprising:

two open-and-close switches, disposed respectively on the first water passage switch valve and the second water passage switch valve, such that when the filter core main body and the seat body are attached to each other, the water is allowed to pass through, and when the filter core main body and the seat body are detached from each other, the water is closed and is not allowed to pass through.

3. The water stoppage structure utilized in a water purifier filter core as claimed in claim 1, further comprising:

a filter core outer shell, disposed and included in the filter core main body;

a filter core bottom cover, disposed and included in the filter core main body;

a connection sleeve, sleeved on a head portion of the filter core, and disposed in a cavity at a head portion of the filter core main body; and a second tight seal ring, disposed between an outer perimeter of the connection sleeve and the cavity at the head portion of the filter core main body, to separate connection and communication inside and outside the filter core main body, wherein the check valve is disposed on the connection sleeve, a water input end of the check valve is connected and in communication with the water input port of the filter core main body, a water output end of the check valve is in communication with a chamber between an inner wall of the filter core outer shell and an outer perimeter of the filter core, through a through hole on a side portion of the connection sleeve.

4. The water stoppage structure utilized in a water purifier filter core as claimed in claim 3, wherein a second water output port of the filter core is connected and in communication with a central through hole of the connection sleeve; while a first water output port of the filter core is connected and in communication with a water passage channel of the connection sleeve.

5. The water stoppage structure utilized in a water purifier filter core as claimed in claim 4, wherein the first water passage switch valve includes a central rod having a central channel, and a liftable valve core in an indent slot on an upper portion of the central rod, a lower end of the central rod is thread-connected to the central through hole of the connection sleeve, the upper portion of the central rod is in communication with a second water output port of the seat body; a first spring is disposed between a lower portion of the liftable valve core, and the indent slot on the upper portion of the central rod; a protrusion rod is disposed on an upper portion of the liftable valve core; a press ring is sleeved around an outer perimeter of the protrusion rod, and is fixed in the indent slot on the upper portion of the central rod, a lower surface of the press ring is a conical face, to act in cooperation with a third tight seal ring fixed on the outer perimeter of the protrusion rod to seal the water; and the first tight seal ring is disposed on an outer wall at the upper portion of the central rod, to form tight seal with an inner wall of the first downward protrusion tube.

6. The water stoppage structure utilized in a water purifier filter core as claimed in claim 5, wherein the second water passage switch valve includes the liftable sleeve, sleeved around an outer perimeter of the central rod, and a second spring, disposed between upper surfaces of the liftable sleeve and the connection sleeve, the liftable sleeve is sleeved inside an upward protrusion tube body of the filter core outer shell; a fourth tight seal ring is disposed between an outer perimeter of the liftable sleeve, and an inner wall of the upward protrusion tube body; a fifth tight seal ring is disposed between the outer perimeter of the liftable sleeve and an inner wall of the second downward protrusion tube; the water passage gap is disposed between the inner wall of the liftable sleeve and an outer wall of the central rod, the first water output port of the seat body and the water passage channel of the connection sleeve are connected and in communication through the water passage gap.

7. The water stoppage structure utilized in a water purifier filter core as claimed in claim 6, further comprising:

a double tight seal ring, disposed between an outer wall for a tube body of the second water output port of the filter core, and the central through hole of the connection sleeve;

a sixth tight seal ring, disposed between an outer wall of the connection sleeve, and an inner wall of the upward protrusion tube body of the filter core outer shell; and a seventh tight seal ring, disposed between an outer wall of the upward protrusion tube body of the filter core outer shell, and the inner wall of the second downward protrusion tube of the seat body.

* * * * *